United States Patent
Boyer et al.

(12)

(10) Patent No.: US 7,671,097 B2
(45) Date of Patent: Mar. 2, 2010

(54) STABLE PHENOLIC RESIN POLYMER DISPERSIONS HAVING LOW FREE ALDEHYDE CONTENT

(75) Inventors: Peter C. Boyer, Conyers, GA (US); Ahmed A. Iman, Clarkston, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 788 days.

(21) Appl. No.: 11/135,635

(22) Filed: May 24, 2005

(65) Prior Publication Data
US 2006/0270809 A1 Nov. 30, 2006

(51) Int. Cl.
*B01F 3/12* (2006.01)
*C08L 61/06* (2006.01)

(52) U.S. Cl. .......................... 516/77; 516/928; 525/504
(58) Field of Classification Search ................. 516/77, 516/928; 525/504
See application file for complete search history.

(56) References Cited

U.S. PATENT DOCUMENTS

| | | | |
|---|---|---|---|
| 2,315,400 A | 3/1943 | D'Alelio | |
| 3,862,060 A | 1/1975 | Anderson et al. | |
| 4,124,554 A | 11/1978 | Fry | |
| 4,400,229 A | 8/1983 | Demmer et al. | |
| 4,785,073 A | 11/1988 | Farkas et al. | |
| 4,788,236 A | 11/1988 | Kopf | |
| 5,200,455 A | 4/1993 | Warren | |
| 5,548,015 A | 8/1996 | Bourlier et al. | |
| 5,552,186 A | 9/1996 | Bourlier et al. | |
| 5,681,917 A | 10/1997 | Breyer et al. | |
| 5,684,118 A | 11/1997 | Breyer et al. | |
| 5,708,121 A | 1/1998 | Parks et al. | |
| 5,770,750 A | 6/1998 | Hutchings et al. | |
| 5,849,858 A | 12/1998 | Everett et al. | |
| 5,864,003 A | 1/1999 | Qureshi et al. | |
| 5,889,137 A | 3/1999 | Hutchings et al. | |
| 6,132,549 A | 10/2000 | Nieckarz et al. | |
| RE37,023 E | 1/2001 | Bourlier et al. | |
| 6,399,719 B1 | 6/2002 | Dopico et al. | |
| 6,420,034 B1 | 7/2002 | Takahashi et al. | |
| 6,706,845 B2 | 3/2004 | Ingram et al. | |
| 6,730,770 B2 | 5/2004 | Coventry-Saylor | |
| 6,753,383 B2 | 6/2004 | Schaefer et al. | |

FOREIGN PATENT DOCUMENTS

EP 0913413 A 5/1999

OTHER PUBLICATIONS

Rempp and Merrill, Polymer Synthesis, Huthig & Wepf, pp. 56-57, dated 1986.
PCT Intl Search Report.

*Primary Examiner*—Timothy J. Kugel
(74) *Attorney, Agent, or Firm*—Michael S. Kerns

(57) ABSTRACT

Stable dispersions of phenolic resins, particularly bisphenol-A/formaldehyde resins, for use in e.g., baking enamels, coatings, adhesives, binders, etc., are disclosed. The dispersions have low levels (e.g., <0.1% by weight) of free aldehyde, thereby reducing environmental harms associated with aldehyde emissions. Low free aldehyde levels are achieved using melamine as an aldehyde scavenger during preparation. It has now been discovered that melamine, in contrast to other scavengers of aldehydes, does not adversely affect dispersion stability, interfere with later processing operations, or negatively impact the final resin product quality (e.g., after curing).

21 Claims, No Drawings

US 7,671,097 B2

STABLE PHENOLIC RESIN POLYMER DISPERSIONS HAVING LOW FREE ALDEHYDE CONTENT

FIELD OF THE INVENTION

The present invention relates to aqueous dispersions of phenolic resin polymers (e.g., aqueous bisphenol-A/formaldehyde resin polymer dispersions). The dispersions have a low content of free aldehyde (e.g., formaldehyde) due to the incorporation of melamine during their preparation. Importantly, the melamine efficiently scavenges free aldehyde without adversely affecting desirable properties of the dispersions, particularly their stability.

BACKGROUND OF THE INVENTION

Phenolic resin dispersions are commercially important materials that are used in an array of diverse products. Examples include coatings, such as anti-corrosive baking enamels for metals and coatings used as food contact surfaces; adhesives; contact adhesives or tack-building agents in many acrylic, vinyl acrylic, vinyl and rubber latexes; binders for organic and inorganic materials; laminates; moldings; and other uses.

Aqueous phenolic resin dispersions made with gums or cellulosic materials as the dispersing agent were found to exhibit poor storage stability. Moreover, the coatings resulting from such dispersions had unacceptable chemical resistance due to the hydrophilic nature of the dispersing agent. Surfactants, such as phosphate esters, have also been tried with limited success, as surfactant-containing dispersions provide unacceptably poor film properties caused by surface migration of the surfactant.

Stable dispersions of phenolic resin polymers have been achieved using a protective colloid material, such as polyvinyl alcohol (PVA), as a dispersant in U.S. Pat. No. 4,400,229. Likewise, novolac resin dispersions are stabilized with PVA in U.S. Pat. No. 4,788,236. Protective colloids can also be used in systems relying on an organic coupling solvent for the phenolic resin, as described in U.S. Pat. Nos. 4,124,554 and 5,200,455. More recently, a stable aqueous dispersion of a hydrophilic phenolic resin has been achieved in U.S. Pat. Nos. 5,552,186 and 5,548,015 by the incorporation of highly hydrophobic etherified bisphenol-A into an aqueous solution of a phenolic resin and a PVA protective colloid.

In addition to their stability in dispersions, however, another major concern associated with phenolic resin polymers in general is the level of their free formaldehyde content. Typical amounts of free formaldehyde in such resins cause formaldehyde to be released into the environment during processing, storage of the treated substrate, and use. Such formaldehyde release is undesirable, especially in an enclosed space. In particular, formaldehyde may be inhaled by workers and may come in contact with the eyes, the mouth, and other parts of the body. Therefore, ways to reduce the level of free formaldehyde in resins and resin dispersions in order to correspondingly lower the formaldehyde emissions resulting from the further processing of these resins and/or from their end products are beneficial.

In addressing the problem of reducing free formaldehyde in certain polymer dispersions, U.S. Pat. No. 6,753,383 teaches the addition of a thioamine compound.

However, rather than dispersions of phenolic polymers (i.e., compositions comprising a phenolic polymer that is dispersed within a separate continuous phase), significantly greater attention has been directed to formaldehyde reduction in phenolic polymer solutions (i.e., single phase compositions). For example, U.S. Pat. No. 5,684,118 teaches the scavenging of formaldehyde in formaldehyde-based resins using a low mole ratio, storage stable, melamine-urea-formaldehyde (MUF) resin additive. Otherwise, the MUF resin, which itself has a low level of formaldehyde emissions, may be used alone to make composite boards, as taught in U.S. Pat. No. 5,681,917.

U.S. Pat. No. 5,889,137 teaches the use of a phenol aralkylation polymer, derived from a phenolic monomer, at least one styrene derivative, and an aryl diolefin, to significantly reduce formaldehyde emissions.

Both U.S. Pat. Nos. 5,864,003 and 6,730,770 teach the modification of phenolic resin resoles by reaction with one or more aldehyde scavengers to lower the amount of free aldehyde in such resins.

Finally, U.S. Pat. No. 6,706,845 teaches the use of a relatively large quantity of catalyst compared to typical amounts in laminating resins, in combination with one or more formaldehyde scavengers during later portions of the A-stage of the resin cook, to yield a phenol formaldehyde resole having low free formaldehyde and low formaldehyde emissions during B- and C-stage resin processing and curing.

In contrast to solutions, however, dispersions are susceptible to losing their homogeneity over time due to phase separation by settling, coalescence, agglomeration, etc. of the dispersed phase. Therefore, storage stability, or the long-term ability of a dispersion to maintain homogeneous, well-mixed dispersed and continuous phases, is a major consideration affecting the practical utility and thus ultimately the salability of a dispersion. As is well known in the art generally (and particularly with respect to the above-noted attempts to find additives that yield stable dispersions), the addition of any component to a dispersion can have an unpredictable effect on both the dispersion stability and the ultimate properties of the materials made from the dispersion. Indeed, many factors, acting both independently and interactively, are known to affect dispersion stability, including zeta potential (i.e., interparticle electrostatic attraction or repulsion), particle size, pH, and solution conductivity. Therefore, the addition of any agent to potentially effect a reduction in free formaldehyde content can also impact any or all of these factors, possibly resulting in destabilization of the dispersion.

In view of the above, there is a need in the art to identify phenolic resin dispersion additives that not only reduce free formaldehyde to more environmentally friendly thresholds, but also provide stable dispersions at economically attractive levels of solids content, viscosity, etc. Likewise, such additives should ideally not affect the desirable characteristics, including reactivity, moisture resistance, strength, etc. of end products of the phenolic resin dispersions.

SUMMARY OF THE INVENTION

It has now been discovered that melamine, when used as an additive in the preparation of an aqueous phenolic resin dispersion, is effective in reducing the free aldehyde content to less than 0.1% by weight. Importantly, the melamine does not adversely impact the stability of the dispersion. Nor does this aldehyde scavenger, to any measurable extent, form cross links with the phenolic resin, interfere with later processing operations, or adversely affect the chemical reactivity of the final resin end product.

Accordingly, in one embodiment the present invention is a storage stable aqueous dispersion of a phenolic resin. The dispersion comprises the reaction product of (i) a heat reactive phenolic resin (e.g., a resole) that is the reaction product of an aromatic alcohol and an aldehyde and (ii) melamine. In a preferred embodiment, the melamine is added in an amount and under conditions whereby the dispersion has a free aldehyde content of less than about 0.1% by weight. In another preferred embodiment, the dispersion is storage stable for at least about 3 months, more preferably for at least about 6 months, even more preferably for at least about 9 months, and still more preferably for at least about 1 year.

In another embodiment, the present invention is a method for making a storage stable aqueous dispersion of a phenolic resin, the method comprising (i) reacting an aromatic alcohol and an aldehyde to form a heat reactive phenolic resin (e.g., a resole) containing free aldehyde, (ii) adding melamine to the phenolic resin to react with the free aldehyde and yield a phenolic resin having a reduced content of free aldehyde, and (iii) forming the storage stable dispersion from the phenolic resin having a reduced content of free aldehyde. In a preferred embodiment, the melamine is added in an amount from about 1 to about 10 molar equivalents per mole of free aldehyde contained in the phenolic resin. In another preferred embodiment, the melamine is reacted with the free aldehyde at a temperature from about 50° C. to about 100° C.

These and other embodiments, as well as various preferred embodiments, are apparent from the following Detailed Description.

DETAILED DESCRIPTION OF THE INVENTION

Aqueous dispersions of the present invention comprise a phenolic resin polymer that is the reaction product of an aromatic alcohol and an aldehyde. The inventors have discovered that melamine can be added to react with free aldehyde in the preparation of such dispersions (e.g., after formation of a resole and prior to formation of a dispersion therefrom), without adversely affecting their stability, ability to be processed, or the physical properties of their end products.

Suitable aromatic alcohols for use in the present invention include phenol; phenol alkylated with one or more alkyl moieties having up to about 10 carbon atoms, such as o-, m-, and p-cresol, xylenols (e.g., 3,4-xylenol or 3,5-xylenol), p-tert-3,4,5-trimethylphenol, 3-ethyl phenol, 3,5-diethyl phenol, p-butyl phenol, 3,5-dibutyl phenol, and p-amylphenol. Other aromatic alcohols include p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, p-phenoxy phenol. Preferred aromatic alcohols, due to their hydrophobicity and consequently the relative ease with which their corresponding phenolic resins form aqueous dispersions, include the class of compounds commonly known as bisphenols, (e.g., 4,4'-alkylidene-diphenol). Examples of suitable bisphenols that can be used as the phenolic resin include 4,4'-isopropylidene-diphenol (commonly known as bisphenol-A), 4,4'-methylidene-diphenol (commonly known as bisphenol-F), and 4,4'-sec-butylidene-diphenol. Of these, bisphenol-A is especially preferred. Mixtures of aromatic alcohols, such as those obtained from blending bisphenol-A with a small amount of another di-functional phenol (e.g., resorcinol, catechol, hydroquinone, or p,p'-dihydroxy biphenyl) may also be used.

Representative of suitable aldehydes for use in phenolic resin dispersions of the present invention are formaldehyde, acetaldehyde, propionaldehyde, n-butylaldehyde, n-valeraldehyde, caproaldehyde, heptaldehyde, straight-chain aldehydes having a carbon number up to about 8, and mixtures thereof. Formaldehyde is preferred aldehyde because of its ready availability at reasonable cost. Materials that form formaldehyde in situ can also be employed.

The relative molar proportions of aromatic alcohol to aldehyde in the phenolic resin polymer resin will affect its crosslink density. Skilled practitioners recognize that the crosslink density of a phenolic resin increases to a maximum and then decreases as the resin functionality is increased. It is believed that when the ortho- and para-directed alkylation of the aromatic alcohol by the aldehyde is carried out to achieve a high resin functionality (e.g., when a bisphenol-A molecule is ortho-substituted with four, the maximum number, of alkylol moieties), the resulting resole will not interact in a manner that causes a high degree of cross linking. Conversely, when the functionality of the resin is too low, the number of alkylol functional groups in the resole is insufficient to form a significant number of crosslinks.

It is preferred to utilize phenolic resins having high crosslink density. Based on the above, the molar ratio of aldehyde (e.g., formaldehyde) to aromatic alcohol rings (known as the "F/P ratio" in phenol/formaldehyde resins) in the phenolic resin is preferably from about 0.85:1 to about 3:1, and more preferably is from about 1:1 to about 2:1, and most preferably is from about 1.1:1 to about 1.5:1. Since the F/P ratio is calculated on a "per aromatic alcohol ring" basis, this quantity is one-half of the value of the molar ratio of aldehyde to aromatic alcohol, when the aromatic alcohol comprises two phenolic rings, as is the case for bisphenol-A, a preferred aromatic alcohol of the present invention.

Preferably, the phenolic resin polymer is prepared as the resole alkylolation reaction product between the aromatic alcohol and aldehyde under alkaline conditions in the presence of any suitable alkaline catalyst. Skilled practitioners recognize that suitable catalysts include the oxides and hydroxides of alkali metals (e.g., sodium, potassium, and lithium oxides and hydroxides) and of alkaline earth metals (e.g., calcium, barium, and strontium oxides and hydroxides). Other strongly basic water-soluble substances that do not react with aldehydes, such as tertiary amines (e.g., triethylamine) and tertiary amino alcohols (2-dimethylamino-2-methyl-1-propanol and 2-dimethylamino-2-hydroxymethyl-1, 3-propanediol) may also be employed. Mixtures of any of the above catalysts may also be effective as alkaline catalysts of the present invention. Preferred catalysts are sodium hydroxide, lime, sodium carbonate, dimethylaminoethanol, and potassium hydroxide. Of these, sodium hydroxide is most widely used. Typically, these catalysts are added as aqueous solutions. Preferably, the amount of catalyst used represents from about 0.1% to about 0.5% by weight of the combined amount of aromatic alcohol and aldehyde used to form the phenolic resin. This quantity of added catalyst normally corresponds to an amount from about 0.0005 to about 0.025, preferably from about 0.0025 to about 0.0125, and more preferably from about 0.005 to about 0.01 moles per mole of aromatic alcohol rings of the aromatic alcohol employed.

The reaction product between the aromatic alcohol and aldehyde is obtained after these components are maintained, preferably in the presence of the alkaline catalyst as described above, at an elevated temperature and for a time sufficient to cause alkylolation (e.g., methylolation) of at least some of the reactive sites of the aromatic alcohol. Alkylolation refers to the addition of a hydroxyalkyl functionality at reactive sites (generally the ortho- and para-positions of the aromatic rings) of the aromatic alcohols to form an adduct.

In the "initial cook" to form a resole from the aromatic alcohol and aldehyde, the temperature is preferably within the range from about 50° C. to about 150° C., and more preferably from about 65° C. to about 110° C. In an especially preferred method, the aromatic alcohol and the aldehyde are brought to an initial temperature of about 75° C., at which temperature the exothermic alkylolation reaction become self-sustaining, such that the reaction heat raises the mixture temperature to about 100° C. The initial cook time needed to form the resole varies as a function of the reaction temperature, the particular aromatic alcohol and aldehyde starting materials, and other factors. In general, it is preferred that the phenolic resin is cooked for a time from about 15 minutes to about 3 hours, and more preferably from about 30 minutes to about 2 hours. Other conditions associated with the formation of the phenolic resin from the aromatic alcohol and the aldehyde, as well as the effects of varying process parameters, such as temperature and catalyst amount, are known in the art and are described, for example, in U.S. Pat. No. 6,706,845 with respect to phenol-formaldehyde adduct formation.

Because it contains functional alkylol groups, the reaction product, typically in the form of a resole, is heat reactive i.e., the resin will continue to polymerize when heat is applied. Heat is usually applied at a later time to effect thermosetting (or crosslinking) of the resin to yield the rigid, 3-dimensional polymer used in the end product (e.g., a coating). Low molecular weight resole reaction products are known in the art and described in more detail, for example, in Rempp and Merrill, POLYMER SYNTHESIS, Huthig & Wepf (1986), p. 56-57. The phenolic resins of the present invention can also be a more advanced reaction product that contains residual free aldehyde, e.g., a resin polymer network averaging 2-20 monomer units in size (joined by alkylene ether bridges or alkylene bridges after subsequent condensation), which can result from acid-catalyzed reaction or condensation of the functional alkylolated species described above.

Melamine is used as an aldehyde scavenger in the preparation of dispersions of the present invention. This compound, unlike others that react with free aldehdye, surprisingly can be used to prepare aqueous phenolic resin dispersions having exceptional storage stability, in addition to low free aldehyde content. The amount of melamine to be added to the phenolic resin is primarily dependent on the amount of free aldehyde remaining therein, after reaction between the aromatic alcohol and the aldehyde, at the time the melamine is added. Preferably, to most efficiently utilize the melamine, it is added after, or towards the end of, the initial cook of the aromatic alcohol and the aldehyde under alkaline conditions to yield a resole. However, skilled practitioners will appreciate that the addition of melamine is possible at a variety of possible times during the preparation of resin dispersions of the present invention, based on the amount of remaining free aldehyde after reaction with the aromatic alcohol, whether that amount is predicted, measured, or calculated.

As stated above, melamine reacts efficiently with even small quantities of free aldehyde remaining, despite the large excess of alkylolated species, low molecular weight phenolic polymer units, and/or unreacted phenol present, with which the melamine could potentially alternatively react. It is preferred to add melamine in an amount from about 1 to about 10 molar equivalents per mole of free aldehyde, and more preferably from about 3 to about 8 molar equivalents per mole. Excessive addition of melamine is not economically advantageous, as it will not result in a reduction of free aldehyde that is appreciable enough to justify the expense of the additional amount of this aldehyde scavenger. Conversely, an insufficient amount of melamine addition will result in non-attainment of the desired level of free aldehyde reduction or the requirement of long reaction times to do so.

Molar equivalents of melamine are based on the theoretical number of moles of free aldehyde, with which a single mole of melamine could react. Each mole of melamine therefore represents six molar equivalents, since each H of the three amino (—NH$_2$) groups of melamine can theoretically react with a mole of an aldehyde such as formaldehyde to give a methylol group, according to the reaction:

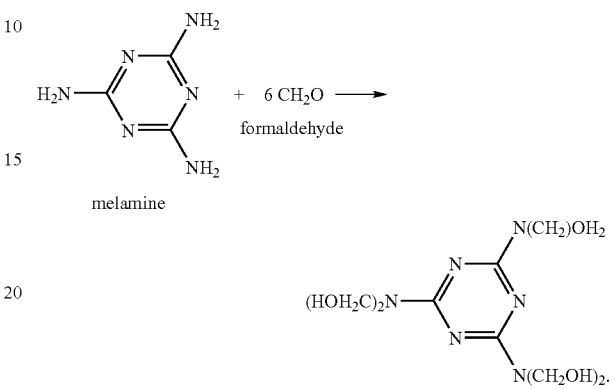

Preferably, the above-mentioned levels of melamine are added to the alkaline phenolic resin, with simultaneous or subsequent mixing and heating, thereby increasing the rate of the melamine reaction and reducing the time required to achieve the desired degree of free aldehyde reduction. In general, carrying out this reaction at a temperature preferably from about 50° C. to about 100° C., and more preferably from about 65° C. to about 85° C., for a time from about 10 minutes to about 1 hour, has been found effective. It is also possible to add melamine sequentially in separate portions, although the total molar equivalents added are still preferably within the ranges given above. If added in this manner, a short period (about 5 to about 15 minutes) of reaction time between additions may be employed.

The free aldehyde content of a resole may initially be as high as 5% by weight or more. Using melamine as described above, a final level that is preferably less than about 2% by weight, and more preferably less than about 0.5% by weight can be achieved. In terms of measuring the initial aldehyde content during preparation of the resole, a number of indicia (e.g., viscosity or refractive index) are known as means to monitor the reaction progress and therefore provide (as an alternative to direct sampling and analysis) an indirect means of determining of the free aldehyde content.

After the phenolic resin is prepared under alkaline conditions, it may be desired to neutralize or acidify the resin. Acids useful for this purpose include inorganic acids such as sulfuric acid, hydrochloric acid, and phosphoric acid and organic acids such as sulfamic acid, tricholoracetic acid, and aromatic di- and polysulfonic acids, such as methane sulfonic, phenyl sulfonic and other organosulfonic acids. Acids that are compatible with phenolic resole resins are known in the art and described, for example, in U.S. Pat. No. 5,864,003. Phosphoric acid is preferred.

Acid addition, which may be accompanied by heating (e.g., to a temperature from about 50° C. to about 1100° C. for a time from about 30 minutes to about 5 hours) is potentially useful for a number of purposes, including stabilization, reduction of viscosity, improvement of dispersion forming characteristics, termination of the base-catalyzed alkylolation reaction to halt resin advancement, etc. After subsequent acidification and heating of the phenolic resin (if performed)

and addition of other components (e.g., protective colloid and water), the free aldehyde content will preferably be less than about 0.1% by weight, at least partly as a result of additional reaction of the melamine with free aldehyde. Even if it is intended not to acidify and/or heat the initially-formed phenolic resin, it is still possible to form dispersions of phenolic resins having less than about 0.1% by weight free formaldehyde, by adjusting the amount of melamine used.

After formation of the resole from the aromatic alcohol and aldehyde, it is preferred to add a coupling solvent that dissolves the phenolic resin to form a solution thereof. In a preferred embodiment, melamine is added to the phenolic resin solution, resulting from combining the resole and coupling solvent. The reaction mixture can be cooled before, during, or after addition of the coupling solvent.

As is known in the art, a coupling solvent is used to facilitate the preparation of phenolic dispersions by introducing a medium that is compatible with both the resin and the continuous phase (e.g., an aqueous phase). Additional desirable characteristics of coupling solvents used in the preparation of phenolic resin dispersions, classes of compounds that can be used as coupling solvents, and specific examples of coupling solvents are known in the art and described, for example, in U.S. Pat. No. 4,124,554.

Preferred coupling solvents are the alkyl ether derivatives of glycol, such as ethylene glycol mono n-butyl ether, sold under the trade name butyl CELLOSOLVE™ (Dow Chemical, Midland, Mich.), and propylene glycol mono n-butyl ether. Preferably, the phenolic resin is highly soluble in the coupling solvent, such that solutions of up to about 85% by weight of the phenolic resin can be made. Preferably, the coupling solvent is added in an amount representing from about 10% to about 40%, and more preferably from about 15 to about 35%, of the combined weight of aromatic alcohol and aldehyde initially used in preparing the phenolic resin. Furthermore, the miscibility of the coupling solvent with water is preferably complete.

Other agents may be incorporated into the phenolic resin of the present invention at various stages of preparation. For example, glycol or glycol derivatives that function as reactive plasticizing diluents, as described in U.S. Pat. No. 4,785,073, may be used. Additional agents described in this patent include accelerators and blowing agents. Agents to improve toughness and other cured resin properties, fire retardants, fillers, reactive modifiers, additional organic solvents, and nitrogen-containing acidic phosphorous latent curing agents, as described in U.S. Pat. No. 5,864,003, may also be incorporated in the phenolic resin formulation. Other agents that may be used in conjunction with the phenolic resin of the present invention include resin modifiers to promote hydrolysis resistance and polymer flexibility, as described in U.S. Pat. No. 5,681,917. Additional plasticizers, as well as thickeners, anti-foam agents, and cure accelerators, as described in U.S. Pat. No. 6,132,549, may also be used.

Formation of a dispersion from the phenolic resin, preferably after the acid-catalyzed reaction step described above, preferably involves the addition of a protective colloid, which is known in the art to react with the phenolic resin upon curing and stabilize the resin by terminating polymer growth at its reactive ends. In particular, it is known that the —OH groups of PVA can block off these reactive ends that would otherwise be available for cross-linking. In U.S. Pat. No. 5,552,186, protective colloids are described in terms of their use in phenolic resin dispersions, as well as their postulated chemical interaction with such resins, both as a component of the resin dispersion and as an agent that forms cross links upon curing. Polyvinyl alcohol (PVA) is a preferred protective colloid, with a solution of partially hydrolyzed (at least 87%) polyvinyl alcohol being particularly preferred. A specific polyvinyl alcohol having the desired characteristics for use as a protective colloid is CELVOL 205® (Celanese Chemicals, Dallas, Tex.), having a molecular weight of about 31,000-50,000 and a degree of hydrolyzation of about 87-89%. If used, the protective colloid is added in an amount representing from about 1% to about 15% by weight, and preferably from about 2% to about 10% by weight, of the combined amount of aromatic alcohol and aldehyde initially charged in preparing the phenolic resin.

To form an aqueous dispersion, an aqueous medium (e.g., water) is added to the phenolic resin before, during, or after addition of the protective colloid. Preferably, the aqueous medium is added gradually and at an even rate, after addition of the protective colloid. Regardless of when the aqueous medium is added, however, an aqueous dispersion can be formed by blending the resulting mixture, preferably comprising the phenolic resin, coupling solvent, protective colloid, and aqueous medium with energy sufficient to form the desired dispersions. The aqueous medium used in preparing dispersions of the present invention is added in an amount that will yield dispersions having a solids (i.e., nonvolatiles) content that is preferably from about 30% to about 90% by weight, and more preferably from about 40% to about 70% by weight, and even more preferably from about 40% to about 60% by weight. Other preferred properties of phenolic resin dispersions of the present invention include a viscosity from about 1,000 to about 10,000 centipoise (cp) at 25° C., more preferably from about 2000 to about 6000 cp at 25° C., a specific gravity from about 1.002 to about 1.05 g/ml at 25° C., and an opaque white color.

Along with the aqueous medium, additives such as miscible coalescing solvents (e.g., diethylene glycol butyl ether) to facilitate blending and dilution, flexible resin materials (e.g., latex-based or aqueous phenoxy resins), and pH adjusting agents (e.g., triethanolamine) may also be incorporated, as described in the above-mentioned U.S. Pat. No. 5,552,186. This patent also describes a number of end uses for aqueous phenolic resin dispersions that are equally applicable to the dispersions of the present invention. The protective colloid, aqueous medium, and other additives described herein may be introduced while the phenolic resin is at an elevated temperature, e.g., after acidification as described above, or these agents may be added after the phenolic resin cools to ambient temperature.

Despite the addition of melamine to reduce the content of free aldehyde, dispersions of the present invention are stable, such that the melamine does not adversely affect the dispersion stability. The property of being "storage stable" means that dispersions of the present invention are able to maintain a homogeneous composition (i.e., without separation, settling, foaming, coalescence, agglomeration, etc.), over an extended period of storage time. Preferably, dispersions of the present invention are storage stable for at least about 3 months, more preferably for at least about 6 months, even more preferably for at least about 9 months, and still more preferably for at least about 1 year. This property may be affirmed by simple visual inspection, where, in the case of an opaque white aqueous dispersion of a phenolic resin, the gradual appearance of a clear, upper layer, may indicate a non-stable dispersion. Otherwise, stability may be assessed by diluting the dispersion. Stable dispersions are readily dilutable, whereas non-stable dispersions upon dilution tend to coalesce, often forming a non-dispersible, gelatinous mass that sinks to the bottom of the standing liquid. In general, in non-stable dispersions, 10% or more of the particles have a diameter of greater than 10 microns, a property which leads to settling out and coalescing of the particles upon storage. Accordingly, in stable dispersions of the present invention, less than 10% of the dispersed particles have a diameter above 10 microns.

Furthermore, despite the addition of melamine, the characteristics of end products (e.g., coatings) made from dispersions of the present invention are comparable to those made from a phenolic resin (e.g., phenol/formaldehyde resin) solution without added melamine. As used with regard to this invention, "comparable" means that the coatings are essentially commercially interchangeable, in terms of their physical and chemical properties (e.g., chemical resistance) considered as a whole.

All references cited in this specification, including without limitation, all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references. In view of the above, it will be seen that several advantages of the invention are achieved and other advantageous results obtained.

As various changes could be made in the above methods and compositions without departing from the scope of the invention, it is intended that all matter contained in this application, including all theoretical mechanisms and/or modes of interaction described above, shall be interpreted as illustrative only and not limiting in any way the scope of the appended claims.

The following examples are set forth as representative of the present invention. These examples are not to be construed as limiting the scope of the invention as these and other equivalent embodiments will be apparent in view of the present disclosure and appended claims.

Comparative Example 1

Resorcinol as an Aldehyde Scavenger

Reaction at 55° C.

Formaldehyde (50 wt-% solution) and bisphenol-A reactants were mixed in approximately a 2.07:1 molar ratio of aldehyde to aromatic alcohol, or about 1.03:1 molar ratio of aldehyde to aromatic rings in the bisphenol-A. The mixture was then heated to 60° C., at which temperature aqueous 25% by weight NaOH solution was added in an amount (on a water free basis) representing about 0.016 moles per mole of bisphenol-A reactant. The alkaline catalyst-containing mixture was heated to 75° C., at which point the reaction exotherm further heated the mixture to 100° C., and this temperature was maintained for 45 minutes. A quantity of the coupling solvent butyl CELLOSOLVE™ (Dow Chemical, Midland, Mich.), representing about 20% of the combined weight of the 50 wt-% formaldehyde solution and bisphenol-A reactants, was then added to dissolve the phenolic resin reaction product, while the resulting solution was cooled to 55° C. The free formaldehyde of this solution was then determined by titration and found to be 1.56% by weight.

Resorcinol was tested for its effectiveness as an aldehyde scavenger as well as its ability to form a stable dispersion of the phenolic resin. A quantity of resorcinol representing 0.56 moles per mole of free formaldehyde was added to the phenolic resin solution. The solution was mixed at 55° C. for 30 minutes to allow the aldehyde scavenger to react at this temperature.

The solution was then acidified by adding aqueous 42% by weight phosphoric acid solution such that the phosphoric acid (on a water free basis) represented about 0.48% of the total weight of the phenolic resin solution. During addition of the phosphoric acid and subsequent 10 minute mixing period, the phenolic resin solution was heated to 80° C. When this temperature was reached, the pH of the phenolic resin solution was adjusted to 4.46 by the addition of a small amount of 25% NaOH solution. After the NaOH addition, the protective colloid CELVOL 205® (Celanese Chemicals, Dallas, Tex.), a polyvinylalcohol (PVA), was added evenly over a 30 minute period, in an amount representing about 6.46% by weight of the combined amount of bisphenol-A and 50 wt-% formaldehyde solution initially charged in preparing the phenolic resin. An aqueous dispersion was then formed by blending the resulting mixture, comprising the phenolic resin, coupling solvent, and protective colloid, with water, while the temperature of the mixture was maintained at 80° C. The water was added gradually, with stirring, over a 1 hour period, and the amount of added water represented about 34% by weight of the total dispersion weight. The resulting dispersion temperature was maintained at 80° C. for an additional 1 hour, such that the phenolic resin was held at this temperature for nearly 3 hours.

After the dispersion was cooled to room temperature, it had a measured viscosity of 6,500 cp and a solids content of 46.6% by weight. However, sampling of this dispersion revealed that it contained 0.75% by weight of free formaldehyde, which exceeded the target level of 0.1% by weight. Without being bound by theory, it is believed that the ineffectiveness of resorcinol as an aldehyde scavenger in phenolic resin dispersions of the present invention is due to excessive reaction with the resin itself, rather than with the far smaller residual amounts of free formaldehyde present in this resin.

Comparative Example 2

Resorcinol as an Aldehyde Scavenger

Reaction at 75° C.

The initial base-catalyzed reaction of formaldehyde and bisphenol-A, followed by dissolution of the phenolic resin reaction product in butyl CELLOSOLVE™, was performed as described above in Comparative Example 1. After cooling the phenolic resin solution to 55° C., it was sampled and the free formaldehyde content was found to be 1.59% by weight.

Resorcinol was tested for its effectiveness, but at a higher reaction temperature than in Comparative Example 1, as an aldehyde scavenger as well as its ability to form a stable dispersion of the phenolic resin. A quantity of resorcinol representing 0.55 moles per mole of free formaldehyde was added to the phenolic resin solution. The solution was then heated to 75° C. and mixed for 30 minutes to allow the aldehyde scavenger to react at this temperature.

The solution was then acidified by adding aqueous 42% by weight phosphoric acid solution such that the phosphoric acid (on a water free basis) represented about 0.48% of the total weight of the phenolic resin solution. During addition of the phosphoric acid and subsequent 10 minute mixing period, the phenolic resin solution was maintained 75° C. At this temperature, the pH of the phenolic resin solution was adjusted to 4.34 by the addition of a small amount of 25% NaOH solution. After the NaOH addition, the protective colloid CEL- VOL 205® (Celanese Chemicals, Dallas, Tex.), a polyvinylalcohol (PVA), was added evenly over a 30 minute period, in an amount representing about 7.85% by weight of the combined amount of bisphenol-A and 50 wt-% formaldehyde solution initially charged in preparing the phenolic resin. An aqueous dispersion was then formed by blending the resulting mixture, comprising the phenolic resin, coupling solvent, and protective colloid, with water, while the temperature of the mixture was maintained at 80° C. The water was added gradually, with stirring, over a 1 hour period, and the amount of added water represented about 34% by weight of the total dispersion weight. The resulting dispersion temperature was maintained at 80° C. for an additional 1 hour, such that the phenolic resin was held at this temperature for nearly 3 hours.

After the dispersion was cooled to room temperature, it had a measured viscosity of 5600 cp and a solids content of 45.6% by weight. However, sampling of this dispersion revealed that it contained 0.78% by weight of free formaldehyde, which exceeded the target level of 0.1% by weight. Again, as in Comparative Example 1, it is believed that the ineffectiveness of resorcinol as an aldehyde scavenger in phenolic resin dispersions of the present invention is due to excessive reaction with the resin itself, rather than with the far smaller residual amounts of free formaldehyde present in this resin. The ineffectiveness of resorcinol, as noted above in Comparative Example 1, was not overcome by increasing the temperature at which it was reacted with free formaldehyde.

Comparative Example 3

Urea as an Aldehyde Scavenger

Reaction at 75° C.

The initial base-catalyzed reaction of formaldehyde and bisphenol-A, followed by dissolution of the phenolic resin reaction product in butyl CELLOSOLVE™, was performed as described above in Comparative Example 1. After cooling the phenolic resin solution to 55° C., it was sampled and the free formaldehyde content was found to be 1.62% by weight. Urea was then tested for its effectiveness as an aldehyde scavenger as well as its ability to form a stable dispersion of the phenolic resin. A quantity of urea representing about 3.93 equivalents per mole of free formaldehyde (or about 0.98 moles per mole) was added to the phenolic resin solution. The solution was then heated to 75° C. and mixed for 30 minutes to allow the aldehyde scavenger to react at this temperature. After this reaction period, the free formaldehyde content was reduced to 0.33% by weight.

The solution was then acidified by adding aqueous 42% by weight phosphoric acid solution such that the phosphoric acid (on a water free basis) represented about 0.48% of the total weight of the phenolic resin solution. The solution was maintained at 75° C. during the phosphoric acid addition and subsequent 10 minute mixing period, and thereafter the solution was heated to 80° C. The pH of the phenolic resin solution was then measured and found to be 4.23. Addition of the protective colloid CELVOL 205® (Celanese Chemicals, Dallas, Tex.) and formation of an aqueous dispersion of the phenolic resin by water addition and mixing, was thereafter performed as described in Comparative Example 1.

After the dispersion was cooled to room temperature, it had a measured viscosity of >10,000 cp and a solids content of 46.0% by weight. Also, sampling of this dispersion revealed that it contained 0.21% by weight of free formaldehyde, which exceeded the target level of 0.1% by weight. Based on the unacceptably high viscosity of the dispersion resulting from adding urea in an amount that was insufficient to achieve the targeted reduction in free formaldehyde, urea is not an effective aldehyde scavenger for phenolic resin dispersions of the present invention. As with resorcinol, it is believed that the ineffectiveness of urea as an aldehyde scavenger in phenolic resin dispersions of the present invention is due to excessive reaction with the resin itself, possibly contributing to undesirable cross linking, rather than with the far smaller residual amounts of free formaldehyde present in this resin.

More importantly, however, upon storage of the phenolic resin dispersion over a 5-week period, the resin was found to separate, rendering it unusable. Therefore, urea, when added in an amount needed to significantly decrease the free aldehyde content, was found not to provide a storage stable dispersion. For this reason, as well as the others noted above, urea is unsuitable as an aldehyde scavenger in phenolic resin dispersions of the present invention.

Example 1

Melamine as an Aldehyde Scavenger

Reaction at 55° C. and 2.52 Equivalents

The initial base-catalyzed reaction of formaldehyde and bisphenol-A, followed by dissolution of the phenolic resin reaction product in butyl CELLOSOLVE™, was performed as described above in Comparative Example 1. After cooling the phenolic resin solution to 55° C., it was sampled and the free formaldehyde content was found to be 1.80% by weight.

Melamine was then tested for its effectiveness as an aldehyde scavenger as well as its ability to form a stable dispersion of the phenolic resin. A quantity of melamine representing about 2.52 equivalents per mole of free formaldehyde (or about 0.42 moles per mole) was added to the phenolic resin solution. The alkaline solution was mixed for 30 minutes at 55° C. to allow the aldehyde scavenger to react at this temperature. After this reaction period, the free formaldehyde content was reduced to 0.69% by weight.

The solution was then acidified by adding aqueous 42% by weight phosphoric acid solution such that the phosphoric acid (on a water free basis) represented about 0.48% of the total weight of the phenolic resin solution. During addition of the phosphoric acid and subsequent 10 minute mixing period, the phenolic resin solution was heated to 80° C. The pH of the phenolic resin solution was then measured and found to be 6.05. Addition of the protective colloid CELVOL 205® (Celanese Chemicals, Dallas, Tex.) and formation phenolic resin by water addition and mixing, was thereafter performed as described in Comparative Example 1.

After the dispersion was cooled to room temperature, it had a measured viscosity of 4,400 cp and a solids content of 46.6% by weight. Also, sampling of this dispersion revealed that it contained 0.24% by weight of free formaldehyde, which exceeded the target level of 0.1% by weight. Importantly, this final level of free formaldehyde was comparable to that achieved (0.21%) in the above Comparative Example 2. In this experiment with melamine as the aldehyde scavenger, however, this comparable degree of free formaldehyde reduction was obtained using a reduced number of melamine equivalents (2.52) compared to the number of urea equivalents (3.93), relative to the moles of free formaldehyde remaining after the phenolic resole formation under alkaline conditions. These results therefore show that melamine is more selective than urea in reacting with free formaldehyde in phenolic resin dispersions of the present invention.

Moreover, in contrast to the use of urea in Comparative Example 2, the use of melamine as an aldehyde scavenger resulted in a phenolic resin dispersion having an acceptable viscosity. More importantly, the resulting dispersion made using melamine, in contrast to urea, showed no signs of separation or instability after more than a 1-year storage period. Thus, melamine was found to provide a storage stable dispersion of phenolic resin when added at the levels indicated above. Based on these results, melamine was investigated further as to conditions under which it could be employed to yield stable phenolic resin dispersions having a free formaldehyde content of less than about 0.1% by weight.

Example 2

Melamine as an Aldehyde Scavenger

Reaction at 75° C. and 4.41 Equivalents

The initial base-catalyzed reaction of formaldehyde and bisphenol-A, followed by dissolution of the phenolic resin reaction product in butyl CELLOSOLVE™, was performed as described above in Comparative Example 1. After cooling the phenolic resin solution to 55° C., it was sampled and the free formaldehyde content was found to be 2.10% by weight.

A higher level of melamine addition, compared to that used in Example 1, was then tested for its effectiveness as an aldehyde scavenger as well as its ability to form a stable dispersion of the phenolic resin. A quantity of melamine representing about 4.41 equivalents per mole of free formaldehyde (or about 0.74 moles per mole) was added to the phenolic resin solution. The alkaline solution was then heated to 75° C. and mixed for 30 minutes to allow the aldehyde scavenger to react at this temperature. After this reaction period, the free formaldehyde content was reduced to 0.12% by weight.

The solution was then acidified by adding aqueous 42% by weight phosphoric acid solution such that the phosphoric acid (on a water free basis) represented about 0.46% of the total weight of the phenolic resin solution. The solution was maintained at 75° C. during the phosphoric acid addition and subsequent 10 minute mixing period, and thereafter the solution was heated to 80° C. The pH of the phenolic resin solution was then measured and found to be 6.10. Addition of the protective colloid CELVOL 205® (Celanese Chemicals, Dallas, Tex.) and formation of an aqueous dispersion of the phenolic resin by water addition and mixing, was thereafter performed as described in Comparative Example 1.

After the dispersion was cooled to room temperature, it had a measured viscosity of 4,300 cp and a solids content of 47.6% by weight. By sampling the dispersion, it was determined that the viscosity could be reduced to 2800 cp by the addition of deionized water in an amount representing 2% by weight of the dispersion. Also, sampling of this dispersion revealed that it contained 0.06% by weight of free formaldehyde, which was below the target value of 0.1% by weight.

In this experiment with melamine as the aldehyde scavenger, a desirable (<0.1% by weight) free formaldehyde result was obtained by adding 4.41 melamine equivalents that were reacted with the alkaline resole for 30 minutes at 75° C. In contrast, the addition of 3.93 urea equivalents in Comparative Example 2 resulted in a free formaldehyde content of the final phenolic resin (0.21%) that was well above this 0.1% by weight target. These results therefore confirm that melamine selectively reacts with free formaldehyde in phenolic resin dispersions of the present invention. Furthermore, this example explicitly illustrates that melamine can be successfully employed at specified addition levels (e.g., 4-6 equivalents) and reaction conditions (e.g., 75° C. for 30 minutes in the alkaline resole), in reducing the free formaldehyde content of such dispersions to below 0.1% by weight.

Moreover, in contrast to the use of urea in Comparative Example 2, the use of melamine as an aldehyde scavenger resulted in a phenolic resin dispersion having an acceptable viscosity. Also, the resulting dispersion made using melamine, in contrast to urea, showed no signs of separation or instability after more than a 1-year storage period. As such, melamine was found to be suitable as a selective scavenger of aldehyde in phenolic resin dispersions of the present inventions.

Example 3

Melamine as an Aldehyde Scavenger

Reaction at 75° C. and 5.72 Equivalents

The initial base-catalyzed reaction of formaldehyde and bisphenol-A, followed by dissolution of the phenolic resin reaction product in butyl CELLOSOLVE™, was performed as described above in Example 2. After cooling the phenolic resin solution to 55° C., it was sampled and the free formaldehyde content was found to be 1.62% by weight.

A slightly higher level of melamine addition, compared to that used in Example 2, was then tested for its effectiveness as an aldehyde scavenger as well as its ability to form a stable dispersion of the phenolic resin. A quantity of melamine representing about 5.72 equivalents per mole of free formaldehyde (or 0.95 moles per mole) was added to the phenolic resin solution. The alkaline solution was then heated to 75° C. and mixed for 30 minutes to allow the aldehyde scavenger to react at this temperature. After this reaction period, the free formaldehyde content was reduced to 0.09% by weight.

The solution was acidified by adding aqueous 42% by weight phosphoric acid solution such that the phosphoric acid (on a water free basis) represented about 0.46% of the total weight of the phenolic resin solution. The solution was maintained at 75° C. during the phosphoric acid addition and subsequent 10 minute mixing period, and thereafter the solution was heated to 80° C. The pH of the phenolic resin solution was then measured and found to be 6.20. Addition of the protective colloid CELVOL 205® (Celanese Chemicals, Dallas, Tex.) and formation of an aqueous dispersion of the phenolic resin by water addition and mixing, was thereafter performed as described in Example 2.

After the dispersion was cooled to room temperature, it had a measured viscosity of 5,100 cp and a solids content of 47.7% by weight. By sampling the dispersion, it was determined that the viscosity could be reduced to 3000 cp by the addition of deionized water in an amount representing 2% by weight of the dispersion. Also, sampling of this dispersion revealed that it contained only 0.03% by weight of free formaldehyde, which was well below the target value of 0.1% by weight.

In this experiment with melamine as the aldehyde scavenger, an even greater reduction of free formaldehyde was obtained using 5.72 melamine equivalents, compared to 4.41 melamine equivalents in Example 3. These results therefore again confirm that melamine is selective in reacting with free formaldehyde in phenolic resin dispersions of the present invention. Importantly, using the above-noted level melamine addition and conditions of time and temperature, the free formaldehyde level in the alkaline resole can be reduced to <0.1% by weight, even before any acidification and/or further heating of the resin.

Moreover, in contrast to the use of urea in Comparative Example 2, the use of melamine as an aldehyde scavenger, even at the higher addition level again resulted in a phenolic resin dispersion having an acceptable viscosity. Also, the resulting dispersion made using melamine, in contrast to urea, showed no signs of separation or instability after more than a 1-year storage period. As such, melamine was found to be suitable as a selective scavenger of aldehyde in phenolic resin dispersions of the present invention, even at this higher addition level. Furthermore, this experiment additionally demonstrated that melamine could be successfully employed at specified addition levels (e.g., 4-6 equivalents) and reaction conditions (e.g., 75° C. for 30 minutes in the alkaline resole), in reducing the free formaldehyde content of such dispersions to below 0.1%.

What is claimed is:

1. A method for making a storage stable aqueous dispersion of a phenolic resin, said method comprising:
   (a) reacting an aromatic alcohol and an aldehyde in the presence of an oxide or hydroxide of an alkali metal or an alkaline earth metal as the primary catalyst to form a heat reactive phenolic resin containing less than about 5% by weight free aldehyde;
   (b) adding a coupling solvent to said heat reactive phenolic resin to form a phenolic resin solution;
   (c) adding melamine to said phenolic resin solution in an amount of about 1 to about 10 molar equivalents per mole of free aldehyde sufficient to react with said free aldehyde and yield a phenolic resin solution having a reduced content of free aldehyde; and
   (d) adding polyvinyl alcohol as a protective colloid and water to said phenolic resin solution to form said storage stable dispersion from said phenolic resin solution having a reduced content of free aldehyde.

2. The method of claim 1, wherein said aromatic alcohol is bisphenol-A, said aldehyde is formaldehyde, and said phenolic resin is a bisphenol-A/formaldehyde resole.

3. The method of claim 2, wherein, after adding melamine in step (b), said reduced content of free formaldehyde in said bisphenol-A/formaldehyde resole is less than about 2% by weight.

4. The method of claim 3, wherein said storage stable dispersion has a free formaldehyde content of less than about 0.1% by weight.

5. The method of claim 2, wherein, in step (a), said bisphenol-A/formaldehyde resole is formed at a temperature from about 50° C. to about 150° C. for a time from about 15 minutes to about 3 hours, and in the presence of an alkaline catalyst.

6. The method of claim 2, wherein, after step (b), said bisphenol-A/formaldehyde resole having a reduced content of free formaldehyde is acidified and heated to a temperature from about 50° C. to about 110° C.

7. An aqueous dispersion of a phenolic resin, made by the method of claim 1, wherein said dispersion is storage stable for at least about 3 months.

8. The dispersion of claim 7, wherein said dispersion is storage stable for at least about 6 months.

9. The dispersion of claim 8, wherein said dispersion is storage stable for at least about 1 year.

10. The dispersion of claim 7, wherein said aromatic alcohol is bisphenol-A, and said phenolic resin is a bisphenol-A/formaldehyde resole.

11. The dispersion of claim 7, wherein said dispersion has a free formaldehyde content of less than about 0.1% by weight.

12. The dispersion of claim 7, wherein said heat reactive phenolic resin is the reaction product of bisphenol-A and formaldehyde, wherein the molar ratio of formaldehyde to aromatic rings in the bisphenol-A is from about 0.85:1 to about 3:1.

13. The dispersion of claim 7, wherein said dispersion has a solids content from about 40% to about 60% by weight and a viscosity from about 2000 to about 6000 cp at 25° C.

14. The dispersion of claim 7, wherein said dispersion comprises a protective colloid and a coupling solvent.

15. The dispersion of claim 7, wherein said aldehyde is formaldehyde.

16. The method of claim 1, wherein, in step (b), melamine is added in an amount from about 3 to about 8 molar equivalents per mole of free formaldehyde contained in said phenolic resin.

17. The method of claim 1, wherein, in step (b), melamine is reacted with free formaldehyde at a temperature from about 50° C. to about 100° C. under alkaline conditions.

18. A storage stable aqueous dispersion of a phenolic resin, said dispersion comprising:
   (I) the reaction product of
      (a) a heat reactive phenolic resin that is the reaction product, in the presence of an oxide or hydroxide of an alkali metal or an alkaline earth metal as the primary catalyst, of an aromatic alcohol and formaldehyde at a molar ratio of formaldehyde to aromatic rings in the aromatic alcohol from about 0.85:1 to about 3:1, wherein said heat reactive phenolic resin contains less than about 5% by weight free formaldehyde, and
      (b) melamine, added to said heat reactive phenolic resin in an amount from about 1 to about 10 molar equivalents per mole of free formaldehyde contained in said phenolic resin, and reacted with said heat reactive phenolic resin at a temperature from about 50° C. to about 100° C. under alkaline conditions;
   (II) a coupling solvent;
   (III) polyvinyl alcohol as a protective colloid; and
   (IV) water,
wherein (I), (II), (III), and (IV) are blended to yield said storage stable aqueous dispersion, having a free formaldehyde content of less than about 0.1% by weight.

19. A method for making a storage stable aqueous dispersion of a phenolic resin, said method comprising:
   (a) reacting an aromatic alcohol and an aldehyde in the presence of an oxide or hydroxide of an alkali metal or an alkaline earth metal as the primary catalyst to form a heat reactive phenolic resin containing less than about 5% by weight free aldehyde;
   (b) adding a coupling solvent to said heat reactive phenolic resin to form a phenolic resin solution;
   (c) adding melamine to said phenolic resin solution in an amount of about 1 to about 10 molar equivalents per mole of free aldehyde sufficient to react with said free aldehyde and yield a phenolic resin solution having a reduced content of free aldehyde;
   (d) adding an acid to said phenolic resin solution having a reduced content of free aldehyde, and
   (e) adding polyvinyl alcohol as a protective colloid and water to said phenolic resin solution of step (d) to form said storage stable dispersion from said phenolic resin solution having a reduced content of free aldehyde.

20. An aqueous dispersion of a phenolic resin, made by the method of claim 19.

21. The dispersion of claim 20, wherein said aromatic alcohol is bisphenol-A, and said phenolic resin is a bisphenol-A/formaldehyde resole.

* * * * *